United States Patent
Moinester

(10) Patent No.: US 8,286,592 B2
(45) Date of Patent: Oct. 16, 2012

(54) PORTABLE PET BATHING DEVICE

(75) Inventor: John Moinester, Niwot, CO (US)

(73) Assignee: Monete, LLC, Niwot, CO (US)

( * ) Notice: Subject to any disclaimer, the term of this patent is extended or adjusted under 35 U.S.C. 154(b) by 0 days.

(21) Appl. No.: 12/777,243

(22) Filed: May 10, 2010

(65) Prior Publication Data

US 2010/0282182 A1    Nov. 11, 2010

Related U.S. Application Data

(60) Provisional application No. 61/177,183, filed on May 11, 2009.

(51) Int. Cl.
  *A01K 13/00*  (2006.01)
(52) U.S. Cl. .................. 119/652; 119/603; 119/665
(58) Field of Classification Search .................. 119/602, 119/603, 604, 652, 665, 600, 650; 15/227; 224/148.1, 148.2, 148.7, 148.3, 148.4, 148.5, 224/148.6, 662, 664, 600; 401/7
See application file for complete search history.

(56) References Cited

U.S. PATENT DOCUMENTS

| | | | |
|---|---|---|---|
| 2,405,154 A | 3/1944 | Logan | |
| 2,663,890 A | 12/1953 | Sullins | |
| 2,669,739 A | 2/1954 | Winberg | |
| 3,701,604 A | 10/1972 | Holroyd | |
| 3,883,897 A | 5/1975 | Lefkowitz et al. | |
| 4,544,087 A * | 10/1985 | Modig | 224/148.2 |
| 4,696,593 A | 9/1987 | Bayless | |
| 4,930,453 A | 6/1990 | Laliberte | |
| 4,948,023 A * | 8/1990 | Tripp | 224/148.2 |
| 4,953,998 A | 9/1990 | McCartherens | |
| 5,067,444 A | 11/1991 | Parker | |
| 5,072,856 A | 12/1991 | Kimble | |
| 5,085,349 A | 2/1992 | Fawcett | |
| 5,168,833 A | 12/1992 | Spears | |
| 5,169,251 A | 12/1992 | Davis | |
| 5,279,257 A | 1/1994 | Temby | |
| 5,303,847 A * | 4/1994 | Cottone | 222/78 |
| 5,466,080 A | 11/1995 | Lee | |
| 5,502,873 A | 4/1996 | Hogan | |
| 5,524,575 A | 6/1996 | Lennon | |

(Continued)

OTHER PUBLICATIONS

International Search Report and Written Opinion for PCT/US2010/034278, mailed Jun. 29, 2010.

*Primary Examiner* — Rob Swiatek
*Assistant Examiner* — Lisa Tsang
(74) *Attorney, Agent, or Firm* — Hamilton, DeSanctis & Cha LLP

(57) ABSTRACT

Portable apparatus and systems for pet bathing. According to one embodiment, a fully contained portable pet washing system includes one or more collapsible fluid bladders, one or more fluid tubes, a variable flow control valve, a bladder holder pack and a detachable fabric-based wash glove. The fluid tubes interface with the collapsible fluid bladders. The variable flow control valve is operable to control the dispensing of wash or rinsing fluid from the collapsible fluid bladders. The bladder holder pack is configured to be fastened as an adjustable waist belt and configured to enclose some portion of the collapsible fluid bladders. The detachable fabric-based wash glove includes at least a portion of an attachment mechanism for engaging the fluid tubes and maintaining the positioning thereof to dispense the wash or rinsing fluid at a location near a palm or finger portion of the detachable fabric-based wash glove.

11 Claims, 14 Drawing Sheets

U.S. PATENT DOCUMENTS

| | | | |
|---|---|---|---|
| 5,722,349 A | 3/1998 | Wolgamuth | |
| 5,727,714 A | 3/1998 | Fawcett | |
| 5,794,570 A | 8/1998 | Foster et al. | |
| 6,032,831 A | 3/2000 | Gardner et al. | |
| 6,055,938 A | 5/2000 | Klein | |
| 6,065,431 A | 5/2000 | Davis | |
| 6,364,168 B1 | 4/2002 | Gardner et al. | |
| 6,497,348 B2 | 12/2002 | Forsman et al. | |
| 6,513,998 B1 | 2/2003 | Barry | |
| 6,553,943 B1 | 4/2003 | Murphy | |
| 6,666,360 B1 * | 12/2003 | Swank | 224/148.2 |
| 6,675,998 B2 | 1/2004 | Forsman et al. | |
| 6,820,780 B2 | 11/2004 | Forsman et al. | |
| 6,834,619 B1 | 12/2004 | Rampersad | |
| 6,892,915 B2 | 5/2005 | Mares | |
| 2003/0075573 A1 * | 4/2003 | Bailey | 224/148.2 |
| 2003/0196608 A1 | 10/2003 | Lee | |
| 2005/0005875 A1 | 1/2005 | Suggs | |
| 2005/0229349 A1 * | 10/2005 | Foser | 15/227 |
| 2006/0032075 A1 * | 2/2006 | Vossoughi et al. | 34/95 |
| 2006/0102097 A1 | 5/2006 | Price | |
| 2006/0151552 A1 * | 7/2006 | Shitaye | 224/148.2 |

* cited by examiner

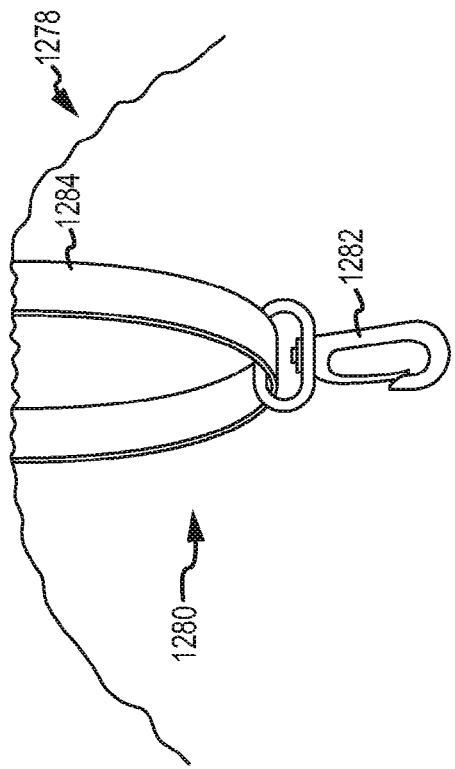
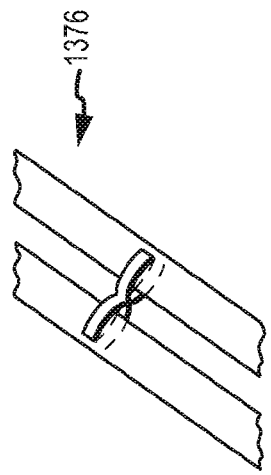
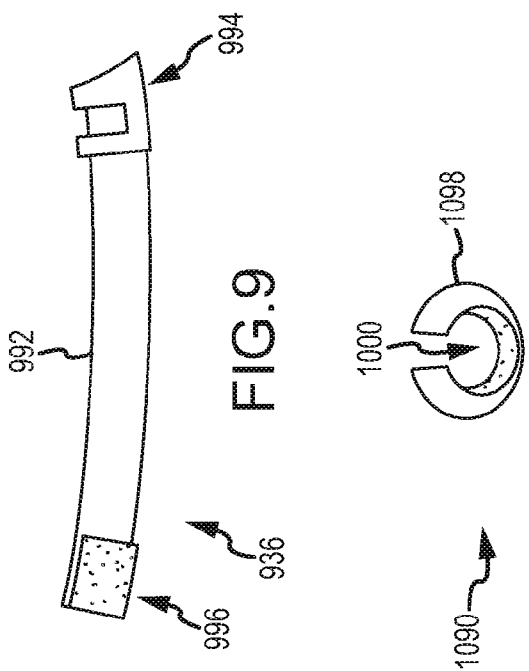
FIG. 12
FIG. 13
FIG. 9
FIG. 10
FIG. 11

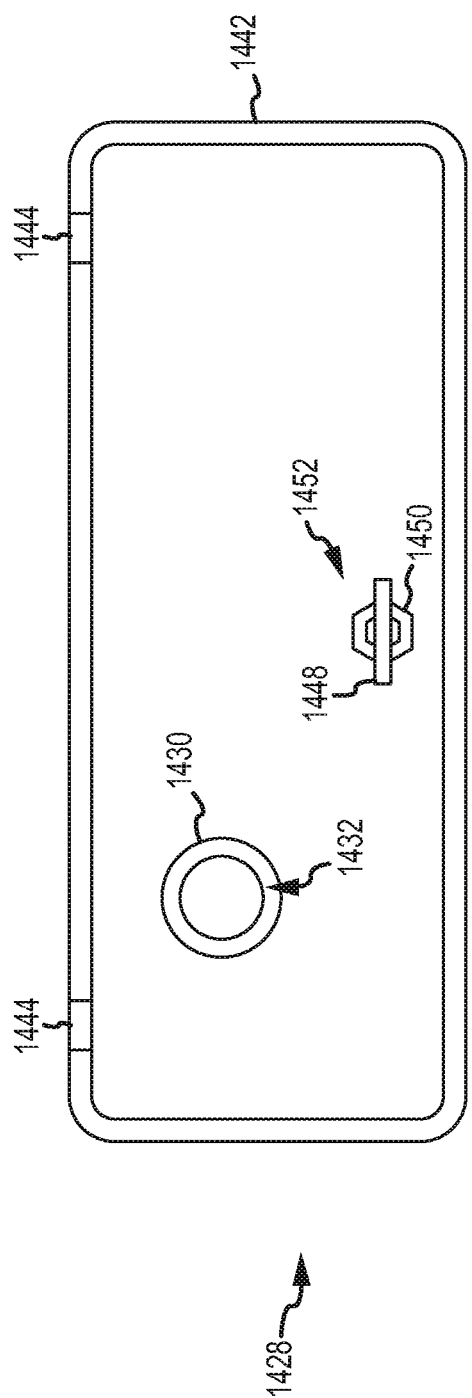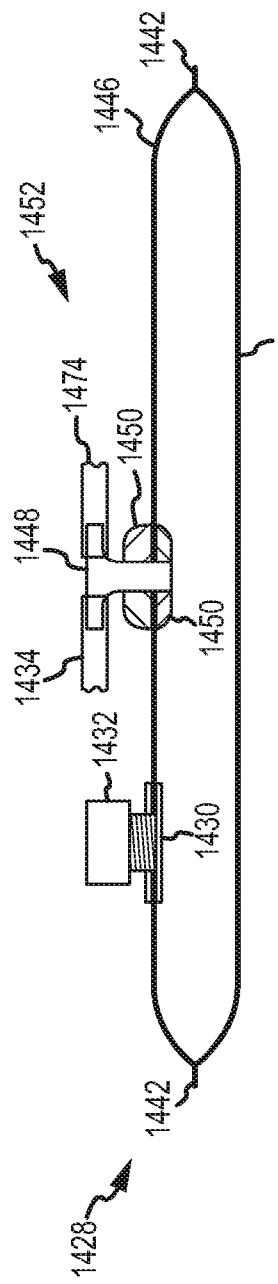

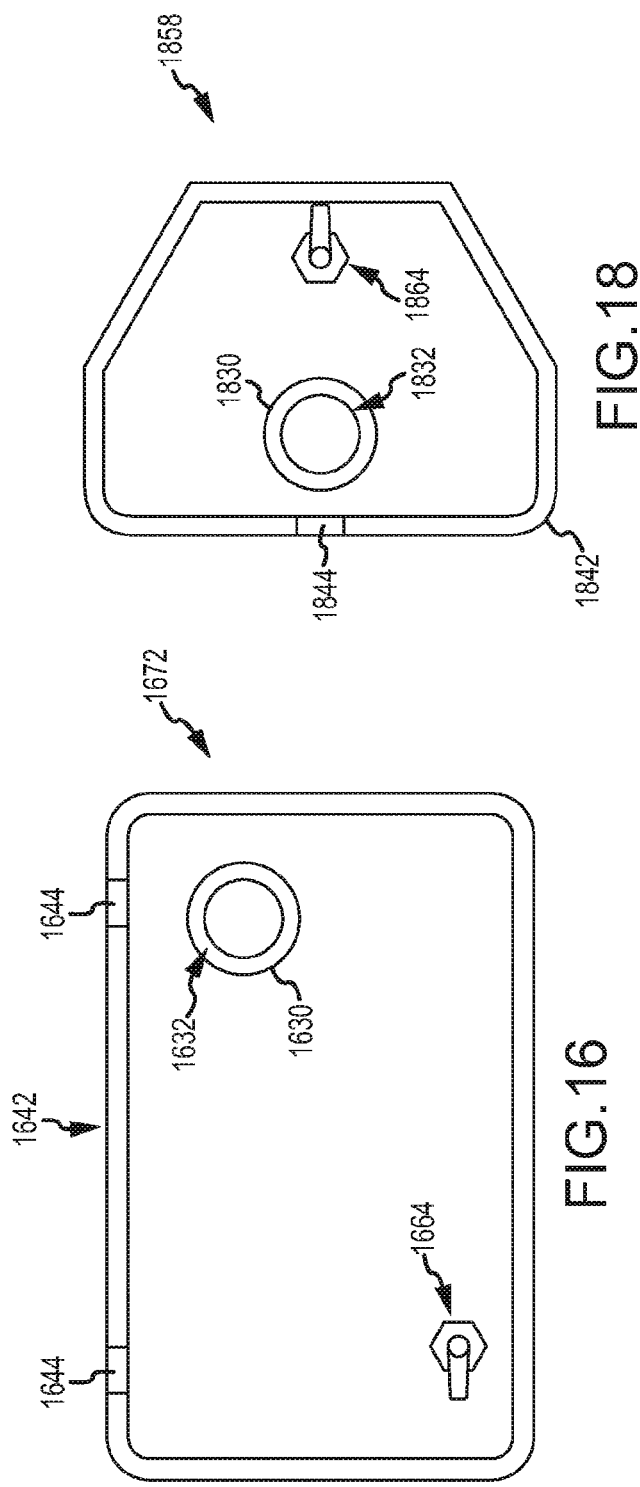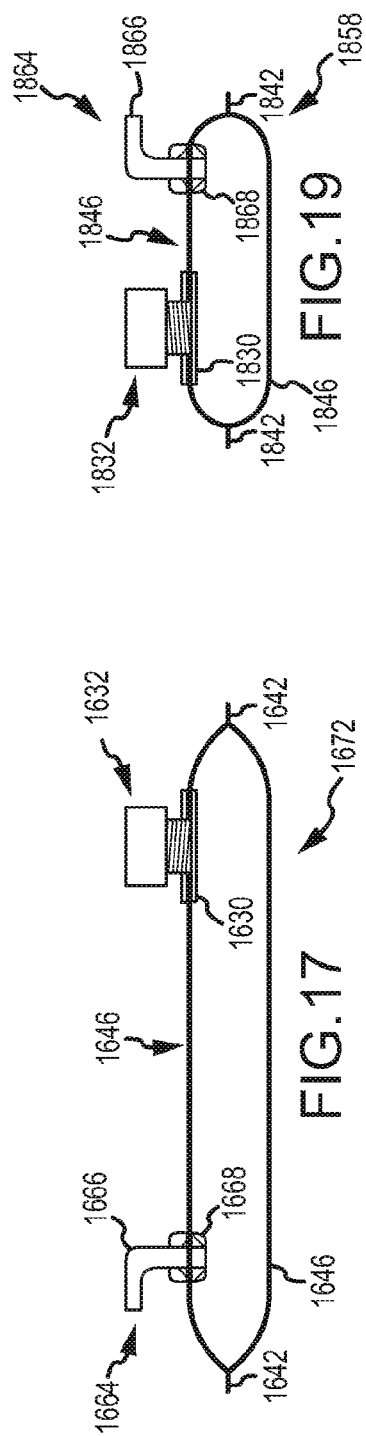

PORTABLE PET BATHING DEVICE

CROSS-REFERENCE TO RELATED APPLICATIONS

This application claims the benefit of priority to U.S. Provisional Patent Application No. 61/177,183, filed on May 11, 2009, the contents of which is hereby incorporated by reference in its entirety for all purposes.

COPYRIGHT NOTICE

Contained herein is material that is subject to copyright protection. The copyright owner has no objection to the facsimile reproduction of the patent disclosure by any person as it appears in the Patent and Trademark Office patent files or records, but otherwise reserves all rights to the copyright whatsoever. Copyright© 2009-2010 Monete, LLC

BACKGROUND

1. Field

Embodiments of the present invention generally relate to pet bathing devices. More specifically, embodiments of the present invention provide a portable pet bathing device with at least one glove, one or more integrated fluid hoses and associated control valves, a heavy fabric holder and a removable bladder assembly, which in combination facilitate pet cleaning.

2. Description of Related Art

When pets (e.g., dogs) are outside, they often get dirty particularly in the paws, legs and in the under coat and tail area. This dirt and mud condition happens regardless of the weather, but is particularly evident in wet conditions. The devices and methods which are currently available to pet owners range from the simple use of a towel to electro mechanical devices with scrubbing mechanisms. A number of devices require the insertion of the pet's paws into an enclosure that will either mechanically clean the paw with a motor driven scrubber or use manual force within a hand-held enclosure. These devices are cumbersome in that they require the forceful insertion of the paw into a device that needs to be held in place while the cleaning method is in process. Most pets are ill disposed to such devices particularly those that make noise. These enclosure cleaners are also limited in that the devices can only clean the paw which fails to clean other areas of the pet including the upper leg, tail and underbelly. The limited water in these cleaners quickly gets dirty and needs to be replaced.

Other simple cleaning devices include large gloves made of microfiber material that rely solely on human hand/finger motion to remove dirt which fails to remove damp or dried on dirt. These gloves can be used in conjunction with a hose; however, the ability to control the hose and clean the pet at the same time becomes very difficult. Additionally, the use of a hose and glove is impractical when away from a plumbing water source or when cold weather does not permit the operation of a hose because it is not available and/or the frigid conditions are extremely uncomfortable to the pet owner. Even in ideal conditions, the use of a hose creates difficulties of holding the pet, directing the water flow and actually cleaning the necessary areas in need of dirt removal.

In view of the foregoing, it would be desirable to have the ability, at any time or place, in any season or in any weather conditions, to clean a pet having both hands free for cleaning and at the same time using water without any mechanical noise or excessive water spray.

SUMMARY

Portable apparatus and systems are described for pet bathing. According to one embodiment, a fully contained portable pet washing system is provided including one or more collapsible fluid bladders, one or more fluid tubes, a variable flow control valve, a bladder holder pack and a detachable fabric-based wash glove. The fluid tubes interface with the collapsible fluid bladders. The variable flow control valve is operable to control the dispensing of wash or rinsing fluid from the collapsible fluid bladders. The bladder holder pack is configured to be fastened as an adjustable waist belt and configured to enclose some portion of the collapsible fluid bladders. The detachable fabric-based wash glove includes at least a portion of an attachment mechanism for engaging the fluid tubes and maintaining the positioning thereof to dispense the wash or rinsing fluid at a location near a palm or finger portion of the detachable fabric-based wash glove.

Other features of embodiments of the present invention will be apparent from the accompanying drawings and from the detailed description that follows.

BRIEF DESCRIPTION OF THE DRAWINGS

Embodiments of the present invention are illustrated by way of example, and not by way of limitation, in the figures of the accompanying drawings and in which like reference numerals refer to similar elements and in which:

FIG. 9 is a magnified side view of an exit tube in accordance with an embodiment of the present invention.

FIG. 10 is a magnified side view of an exit tube hold down strap in accordance with an embodiment of the present invention.

FIG. 11 is magnified side view of an exit tube hold down elastic in accordance with an embodiment of the present invention.

FIG. 12 is a magnified view of a bladder clip assembly that may be used in accordance with an embodiment of the present invention.

FIG. 13 is a magnified view of a tube clip that may be used in accordance with an embodiment of the present invention.

FIG. 14 is a magnified top view of a dual glove water bladder in accordance with an embodiment of the present invention.

FIG. 15 is a magnified side view of the dual glove water bladder of FIG. 14.

FIG. 16 is a magnified top view of a single glove water bladder in accordance with an embodiment of the present invention.

FIG. 17 is a magnified side view of the single water bladder of FIG. 16.

FIG. 18 is a magnified top view of a soap bladder in accordance with an embodiment of the present invention.

FIG. 19 is a magnified side view of the soap bladder of FIG. 18.

DETAILED DESCRIPTION

Figure 1:
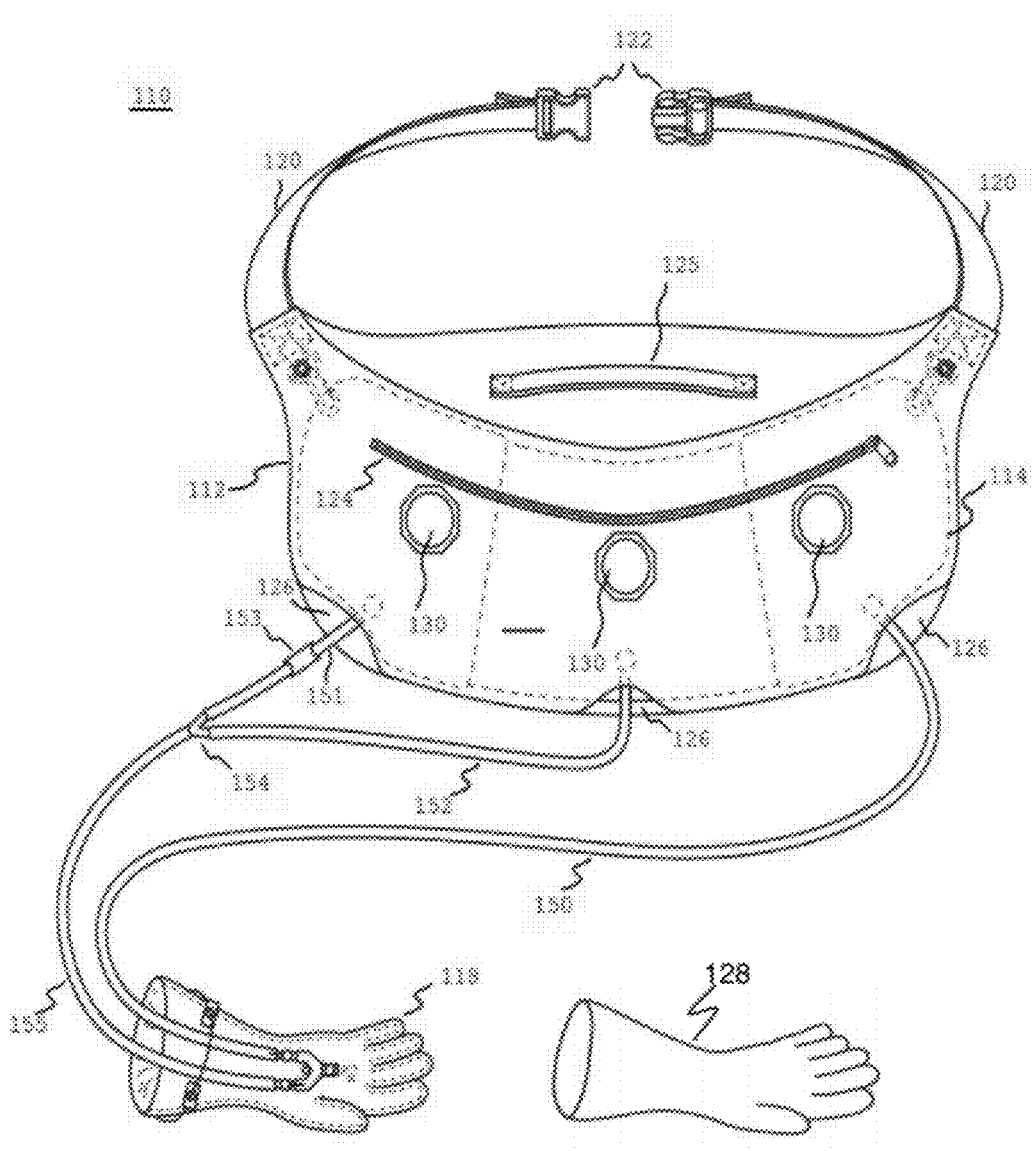
FIG. 1 is a front perspective view of a portable pet bathing system in accordance with an embodiment of the present invention.

Portable apparatus and systems are described for pet bathing. According to one embodiment, a portal pet bathing system includes a water bladder, a separate wash/rinse bladder, fluid tubes with control valves for one hand or two hand operation, a bladder holder fastened as an adjustable waist belt and one or more detachable wash gloves with attachment means for receiving the fluid tubes and for maintaining the positioning of fluid tubes so as to dispense the wash or rinsing fluid at a specified external position of the glove(s)—preferably at or near a palm portion of the glove and in the direction of a finger portion of the glove. In various embodiments, the bladder assembly is easily installed and removed from the bath belt to change for either a right-handed user or a left-handed user as well as removal and replacement with various bladder configurations. The bath belt (e.g., a fanny pack) can be worn either on the front or the back depending on the preference of the user. In one embodiment, the glove(s) is (are) able to receive and position the end of the fluid tubes in such a manner as to provide water flow directly to the area around the thumb, index and middle finger. The glove(s) is (are) easily detachable from the system so as to provide the ability to replace a dirty glove and/or wet glove with a clean, dry glove. In some embodiments, the glove is designed to be worn by either the right or left hand. In a two glove configuration, one glove can be used to wash the dirty area and the second glove can be used to rinse the cleaned area, thereby allowing the user to clean the pet in a shorter period of time. Various other configurations and embodiments are contemplated to provide high flexibility for the desires of the user. Contemplated configurations include, but are not limited to, (i) a single glove, a three liter capacity bladder with a six liter capacity bladder configuration, (ii) a two glove, a three liter capacity bladder with a six liter capacity bladder configuration, (iii) a single glove, two three liter capacity bladders with a six liter capacity bladder configuration and (iv) a single glove, a single six liter capacity bladder configuration. All of the aforementioned contemplated configurations may be used in connection with a bladder holder in the form of a waist belt or a back pack depending upon the cleaning/rinse fluid capacity needs and number of bladders used. Additionally, all of the aforementioned contemplated configurations can be used with water and various mixtures of soap and or conditioners as well as any other liquids the user desires to apply to the pet. Such liquids can include a water and vinegar mixture for the removal of allergens from the pet's coat or some over-the-counter medical mixture or other medical mixture prescribed by a veterinarian to treat a skin or coat condition, for example.

According to various embodiments of the present invention, the flushing attributes of water delivered by gravity are combined with a variable flow valve to a glove from a bladder located within a belt strapped around the waist or located within a backpack worn on the user's back. In an embodiment including two gloves and a soap attachment, gentle and variable introduction of a soap/water mixture may be provided directly to the area needed with the use of the hand while freeing the other hand to rinse the cleaned area.

In another embodiment, a single glove washer is provided so as to make the other hand available to restrain the pet if necessary. The single-hand embodiment may provide for the use by either hand via a six finger glove, for example, or by way of a five finger glove that can simply be flipped over.

Embodiments of the present invention, seek to provide effective means of cleaning a pet as a result of the introduction of fluids, including, but not limited to, a soap mixture and/or simple water rinse capability, via a gravity-assisted fluid delivery system. Thus, fluids may be delivered during pet cleaning operations in a controlled manner without requiring a pressure motor or a plumbing water source.

Embodiments of the present invention seek to control the flow of fluids from the bladder(s) in a manner that provides the greatest flexibility to the user. Such mechanisms include but are not limited to 1) variable control valves 2) finger pinch clamps 3) three way control valves and 4) combinations thereof. Such mechanisms are placed in various positions along the tubing with use of devices such as "Y" connectors and barbed tube connectors.

In the following description, for the purposes of explanation, numerous specific details are set forth in order to provide a thorough understanding of embodiments of the present invention. It will be apparent, however, to one skilled in the art that embodiments of the present invention may be practiced without some of these specific details.

Terminology

Brief definitions of terms, abbreviations, and phrases used throughout this application are given below.

The terms "connected" or "coupled" and related terms are used in an operational sense and are not necessarily limited to a direct physical connection or coupling. Thus, for example, two devices may be couple directly, or via one or more intermediary media or devices. As another example, devices may be coupled in such a way that information can be passed there between, while not sharing any physical connection on with another. Based on the disclosure provided herein, one of ordinary skill in the art will appreciate a variety of ways in which connection or coupling exists in accordance with the aforementioned definition.

The phrases "in one embodiment," "according to one embodiment," and the like generally mean the particular feature, structure, or characteristic following the phrase is included in at least one embodiment of the present invention, and may be included in more than one embodiment of the present invention. Importantly, such phases do not necessarily refer to the same embodiment.

If the specification states a component or feature "may", "can", "could", or "might" be included or have a characteristic, that particular component or feature is not required to be included or have the characteristic.

The term "responsive" includes completely or partially responsive.

FIG. 1 is a front perspective view of a portable pet bathing system in accordance with an embodiment of the present invention. In the illustrated example, portable bath assembly 110 includes a waist pack 112, a bladder assembly 114 and a single, interchangeable wash glove 118 or a six-finger glove 128 that can be worn on a user's left or right hand.

According to the present example, portable bath assembly 110 is designed to be worn around a user's waist secured by belts 120 and side release buckle 122. Portable bath assembly 110 can be worn with waist pack 112 in the front or in the rear position.

In the present example, bladder assembly 114, including three separate fluid bladders, are placed inside waist pack 112 via the opening created from zipper 124. Each compartment of the bladder assembly 114 can be filled with desired fluid, e.g., soap, water, conditioner or the like, through a capped outlet 130 extending through the front wall of the waist pack. The associated tubing 150, 151 and 152 of water bladder assembly 114 is pulled through openings 126 and attached externally to wash glove 118 as described in more detail below.

Based on the disclosure provided herein, one of ordinary skill in the art will recognize a variety of different pack configurations, bladder assemblies and gloves that may be used in relation to different embodiments of the present invention. For example, in one embodiment, a bladder assembly having only two bladders (and including a subset of the depicted tubing 150, 152, 155 with tubes 152 and 155 being uncut) may be initially provided to the user. An expansion kit, including (i) an additional bladder or a three compartment bladder assembly, such as bladder assembly 112, (ii) Y connector 154 and (iii) and extra tubing 151 and finger pinch clamp 153, may be purchased separately by the user to increase the capacity of the portable bath assembly 110, or provide the ability to deliver a conditioner only mix at the end of the cleaning process.

While in the context of FIG. 1 the bladders are show as being connected, in alternative embodiments, one or more of the bladders may be separate and independent.

In various embodiments, the bladders can be constructed of flexible materials such as TPU (Thermoplastic Polyurethane), EVA (Ethylene Vinyl Acetate), EHP (Elastic hydrocarbon Polymer) or the like. The tubing can be TPU, EVA, Vinyl, flexible PVC or low density polyethylene. The bladders are typically collapsible, but in alternative embodiments could be formed of a rigid or semi-rigid material, such as a polyurethane laminate. The valves and Y connectors are typically made of a light weight material, such as high density polyethylene, PVC or polypropylene. The waist pack may be constructed from various types of materials, including, but not limited to, Rip-Stop polyester with or without a PVC backing, 1000 denier nylon with a polyurethane coating for water repellant capacity or 600D polyester with or without a PVC backing.

While in FIG. 1 the tubes are shown interfacing with wash glove 118, in other embodiments, it is contemplated that wrist and/or arm straps (not shown) may be used to secure the flow control mechanism to the user's hand/arm. In such an embodiment, the wash glove 118 becomes optional.

Similarly, while in the context of FIG. 1, a waist pack is described as the means for holding the bladders, in alternative embodiments, it is contemplated that the pack can be eliminated by simply attaching the bladders to a belt that goes around the user's waist.

Figure 2:
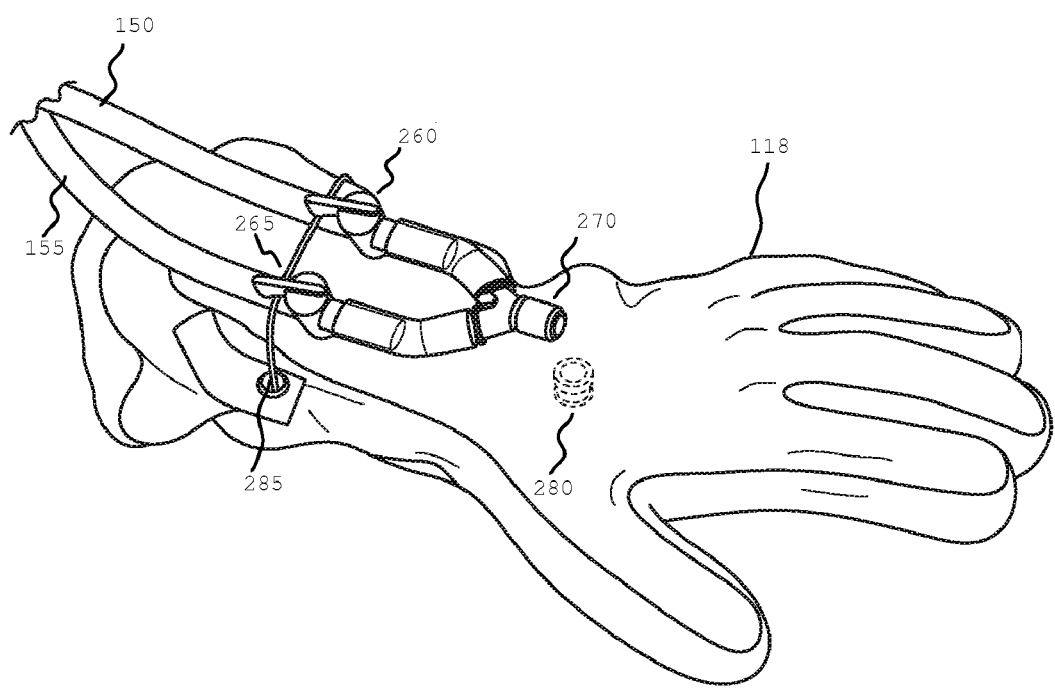
FIG. 2 is a magnified palm view of an interchangeable wash glove in a right-handed configuration with the end of water/soap tubes installed in accordance with an embodiment of the present invention.

FIG. 2 is a magnified palm view of the interchangeable wash glove 118 of FIG. 1 in a right-handed configuration with the end of water/soap tubes installed in accordance with an embodiment of the present invention. According to the current example, water or a water and soap mixture, for example, may be delivered to the dirty area of the pet by a glove tube assembly 270. In order to consistently present the fluids at a point that is most effective for cleaning the pet which is near the fingers, the glove tube assembly may be affixed in placed or otherwise engaged to maintain the positioning thereof with an attachment means of some kind, such as a snap fastener, a hook and loop fastener, an elastic loop or strap, a cloth tube or other clothing or mechanical fasteners. In the embodiment depicted, one half of a snap fastener (not shown) is attached to the glove tube assembly and the other half of the snap fastener 280 is attached to both sides of the glove. In this manner, the glove tube assembly may be disconnected from one side of the glove and reconnected to the other side to allow the glove 118 to be placed on the left hand.

According to one embodiment, wash glove 118 is constructed of a microfiber material. As illustrated by the current example, glove tube assembly 270, the associated fluid control valves 260 and 265 and tubes 150 and 155 can be easily disconnected from the glove 118 to allow the glove to be washed or replaced. Additionally, as indicated above, the wash glove 118 may be interchangeable between the right hand and left hand by simply unsnapping the glove 118 from the glove tube assembly 270, flipping the glove 118 over so thumb is now on the other side and engaging the corresponding snap connector components. The tubing 150 and 155 are held in place against the wrist by draw cord 285 and cord lock toggle (not shown). Other embodiments of the associated fluid control valves could include a single valve with two incoming barbs for the tubing 150 and 155 with a related exit tube positioned with the glove attachment mechanism.

Figure 3:
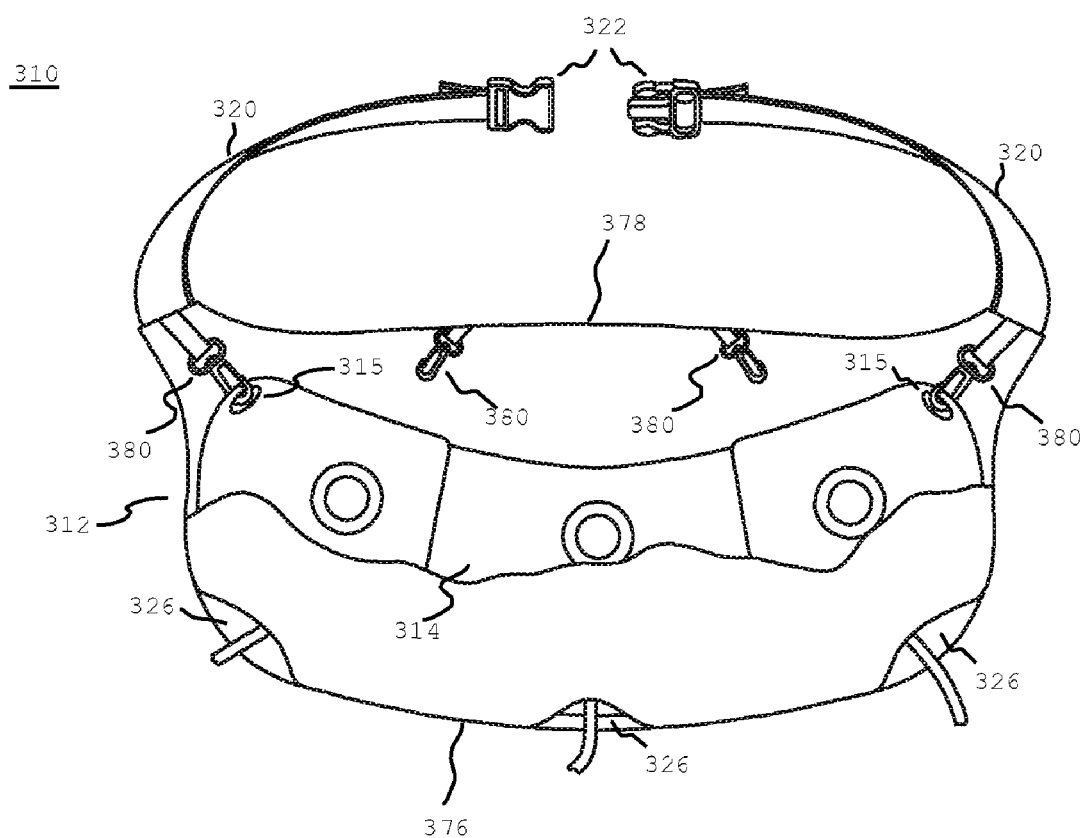
FIG. 3 is a partial cross sectional view of the interior of a waist pack of a portable pet bathing system in accordance with an embodiment of the present invention.

FIG. 3 is a partial cross sectional view of the interior of a waist pack 312 of a portable pet bathing system 310 in accordance with an embodiment of the present invention. According to the present example, the waist pack 312 is constructed by sewing front panel 376 to back panel 378 to form openings 326. The bladder assembly 314 is secured inside waist pack 312 by hook assemblies 380 or alternative securing mechanism. An exemplary hook assembly 380 is discussed further below with reference to FIG. 12. Alternative securing mechanisms include hook and loop fastener, such as Velcro, double-sided tape, separate elastic pockets formed within the waist pack 312 or the like.

Continuing with the present example, two to four hook assemblies 380 may be provided in a manner that accommodates various configurations of bladder assemblies. In various configurations, the bladder assembly 314 may be secured by placing an open end of a hook 1282 (see, e.g., FIG. 12) into an opening 315 along the edge of the bladder assembly 314.

As indicated above, while one or more of the bladders may be connected and form a bladder assembly 314 in some embodiments, in alternative embodiments, one or more of the bladders may be separate and independent. In such embodiments, the inside hooks 380 would typically connect to the larger water bladder to provide positioning support; however, the smaller bladders may be supported in position solely by exterior collars (see, e.g., cap collar 2010) and the larger water bladder or by other means.

Figure 4:
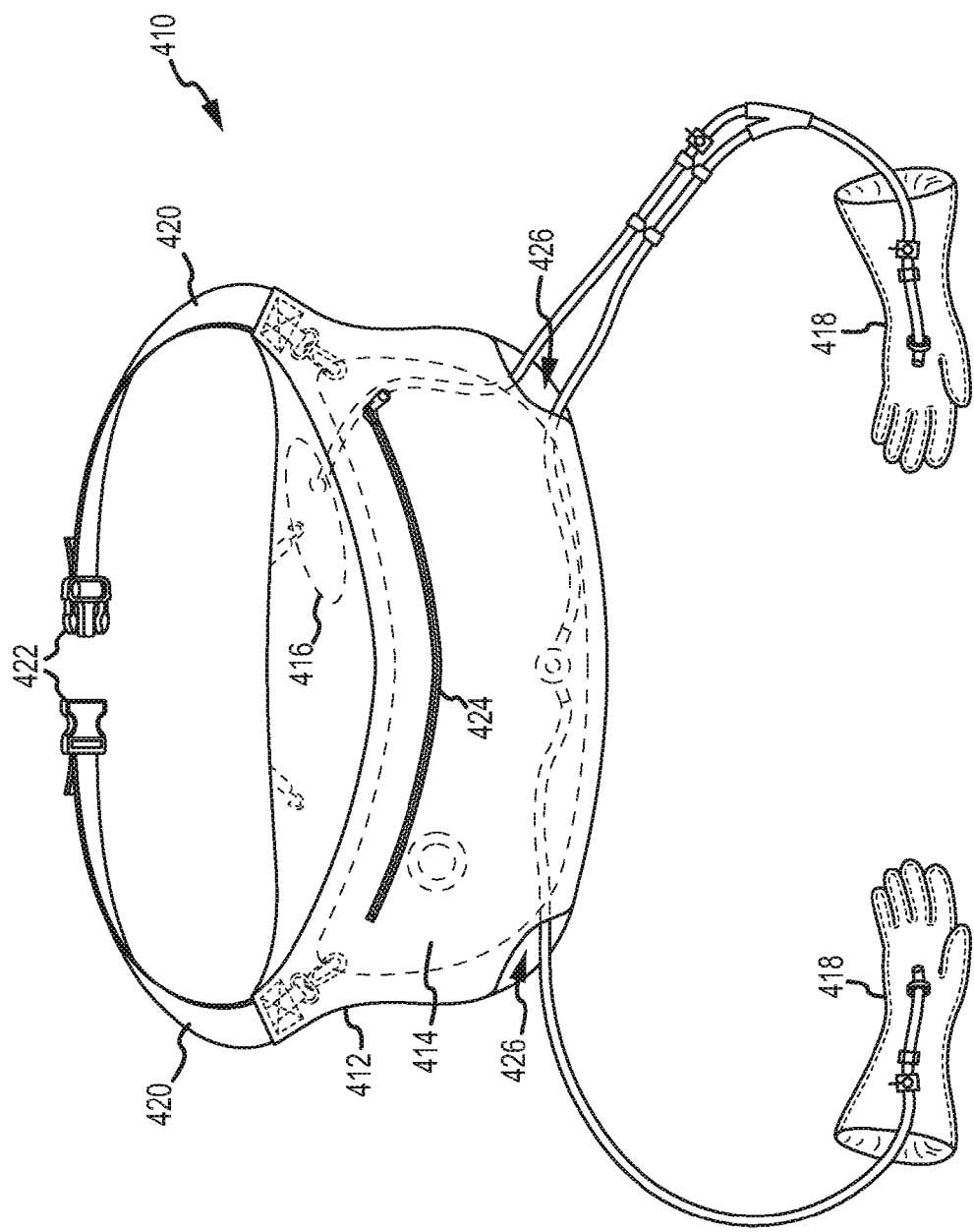
FIG. 4 is a front perspective view of a portable pet bathing system in a dual glove configuration with a soap attachment in accordance with an embodiment of the present invention.

FIG. 4 is a front perspective view of a portable pet bathing system 410 in a dual glove configuration with a soap attachment 416 in accordance with an embodiment of the present invention. In the illustrated example, portable bath assembly 410 includes a waist pack 412, a dual glove water bladder assembly 414, a soap bladder attachment 416 and wash gloves 418. The construction of various bladders that may be used with the portable pet bathing system is illustrated in FIGS. 14, 15, 16, 17, 18, and 19.

According to the present example, portable bath assembly 410 is designed to be worn around a user's waist secured by belts 420 and side release buckle 422. Portable bath assembly 410 can be worn with waist pack 412 in the front or in the rear position. Dual glove water bladder assembly 414 and soap bladder attachment 416 are placed inside waist pack 412 via the opening created from zipper 424. The associated tubing of dual glove water bladder assembly 414 and soap bladder attachment 416 is pulled through openings 426 and attached externally to wash gloves 418. Based on the disclosure provided herein, one of ordinary skill in the art will recognize a variety of different pack configurations, bladders and gloves that may be used in relation to different embodiments of the present invention.

In various embodiments, the bladders can be constructed of flexible materials, such as TPU (Thermoplastic Polyurethane), EVA (Ethylene Vinyl Acetate), EHP (Elastic hydrocarbon Polymer) or the like. The tubing can be TPU, EVA, Vinyl, flexible PVC or low density polyethylene. The bladders are typically collapsible, but in alternative embodiments could be formed of a rigid or semi-rigid material, such as a polyurethane laminate or the like. The valves and Y connectors are made of a light weight material, such as high density polyethylene, PVC, polypropylene or the like. The waist pack is made of material, such as Rip-Stop polyester with or without a PVC backing, 1000 denier nylon with a polyurethane coating for water repellant capacity or a 600D polyester with or without a PVC backing or the like.

Figure 5:
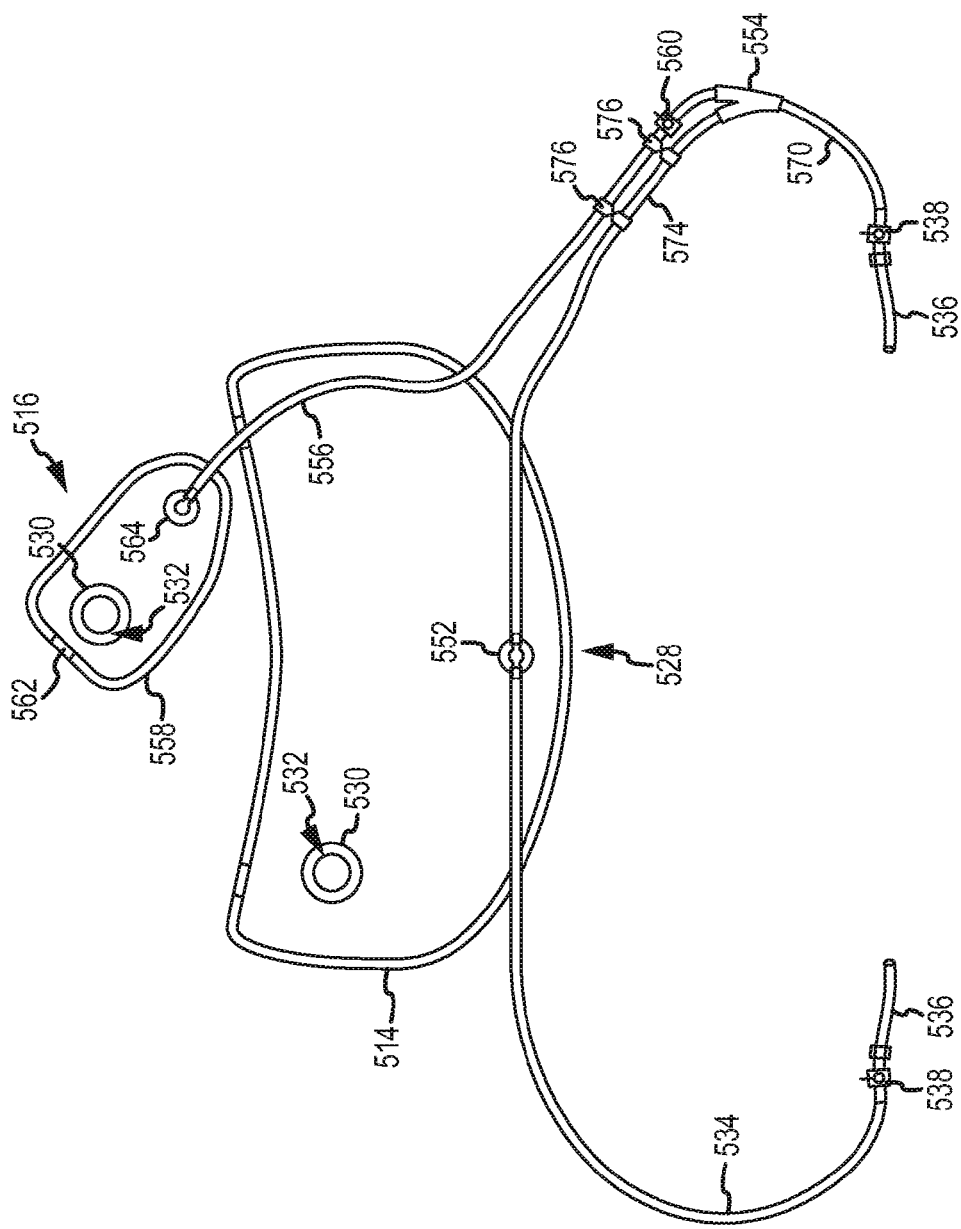
FIG. 5 is a perspective view of the portable pet bathing system of FIG. 4 illustrating interior elements of a dual glove water bladder assembly, a soap bladder and related tubing in accordance with an embodiment of the present invention.

FIG. 5 is a perspective view of the portable pet bathing system 410 of FIG. 4 illustrating interior elements of a dual glove water bladder assembly 514, a soap bladder 516 and related tubing in accordance with an embodiment of the present invention. According to the present example, a large capacity flexible, collapsible water bladder 528 is filled by outlet neck 530 closed by cap member 532. The water exits bladder 528 from outlet 552, traveling through water tubes 534, 574 and mixture tube 570 and exiting from glove tubes 536. The flow of water is modulated by control valves 538.

A user may desire to include a soap, conditioner and/or rinse with water for more effective pet cleaning. This option is provided as illustrated in FIG. 5 by including soap bladder attachment 516 in combination with the water bladder assembly 514. In the present example, soap bladder attachment 516 consists of soap bladder 558, soap tube 556 and soap valve 560 connected to water tube 574 by means of Y connector 554. If soap valve 560 is in the open position, the soap, conditioner and/or rinse will mix with the water from tube 574 into tube 570 exiting through glove tube 536 when control valve 538 is in the open position. Tube clips 576 may be installed on tubes 556 and 574 at appropriate positions to prevent the tubes from becoming tangled. A specific configuration of tube clip 576 is discussed below with reference to FIG. 13.

Figure 6:
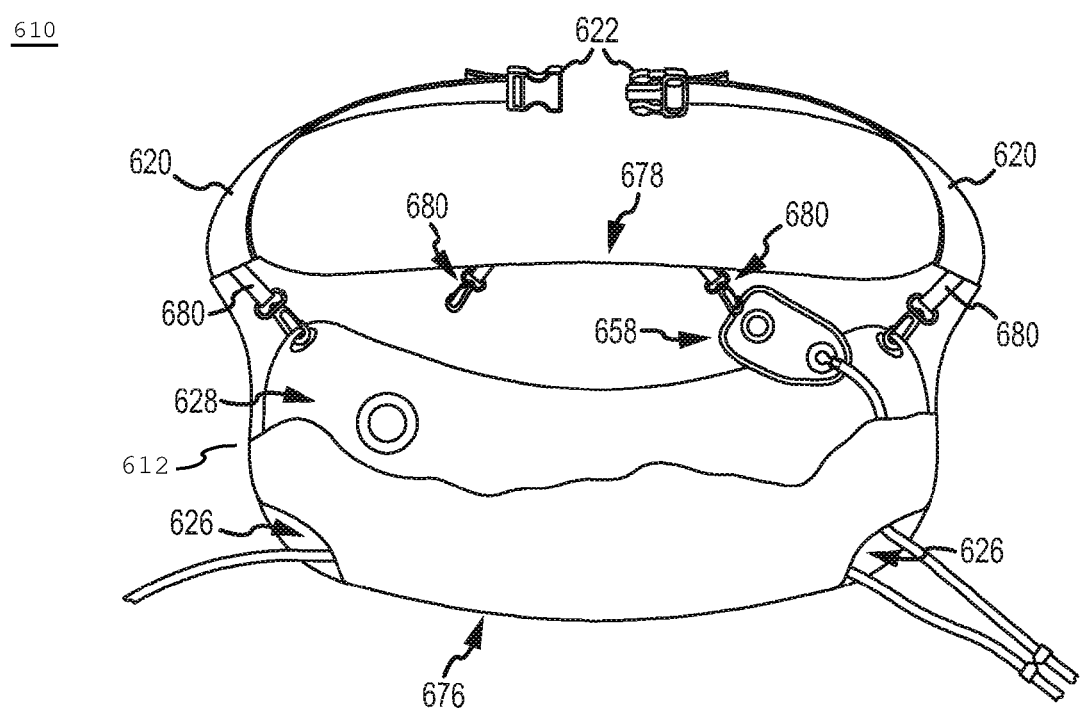
FIG. 6 is a partial cross sectional view of the interior of a waist pack with a dual glove water bladder assembly and a soap bladder attachment installed in accordance with an embodiment of the present invention.

FIG. 6 is a partial cross sectional view of the interior of a waist pack 612 with a dual glove water bladder assembly 628 and a soap bladder attachment 658 installed in accordance with an embodiment of the present invention. According to the present example, the waist pack 612 is constructed by sewing front panel 676 to back panel 678 to form openings 626. The dual glove bladder 628 and soap bladder 658 are secured inside waist pack 612 by hook assemblies 680. An exemplary hook assembly 680 is discussed further below with reference to FIG. 12. Alternative securing mechanisms include hook and loop fastener, such as Velcro, double-sided tape, separate elastic pockets formed within the waist pack 612, or the like.

Continuing with the present example, four hook assemblies 680 are provided in a manner that accommodates various configurations of bladders, including the dual glove bladder 628, a single glove bladder (not shown) and the soap bladder 658. In various configurations, the bladders may be secured by placing an open end of a hook 1282 (see, e.g., FIG. 12) into an opening 1444 of a dual glove bladder 1428 (see, e.g., FIG. 14), an opening 1644 of a single glove bladder 1672 (see, e.g., FIG. 16) and an opening 1844 of a soap bladder 1858 (see, e.g., FIG. 18).

Figure 7:
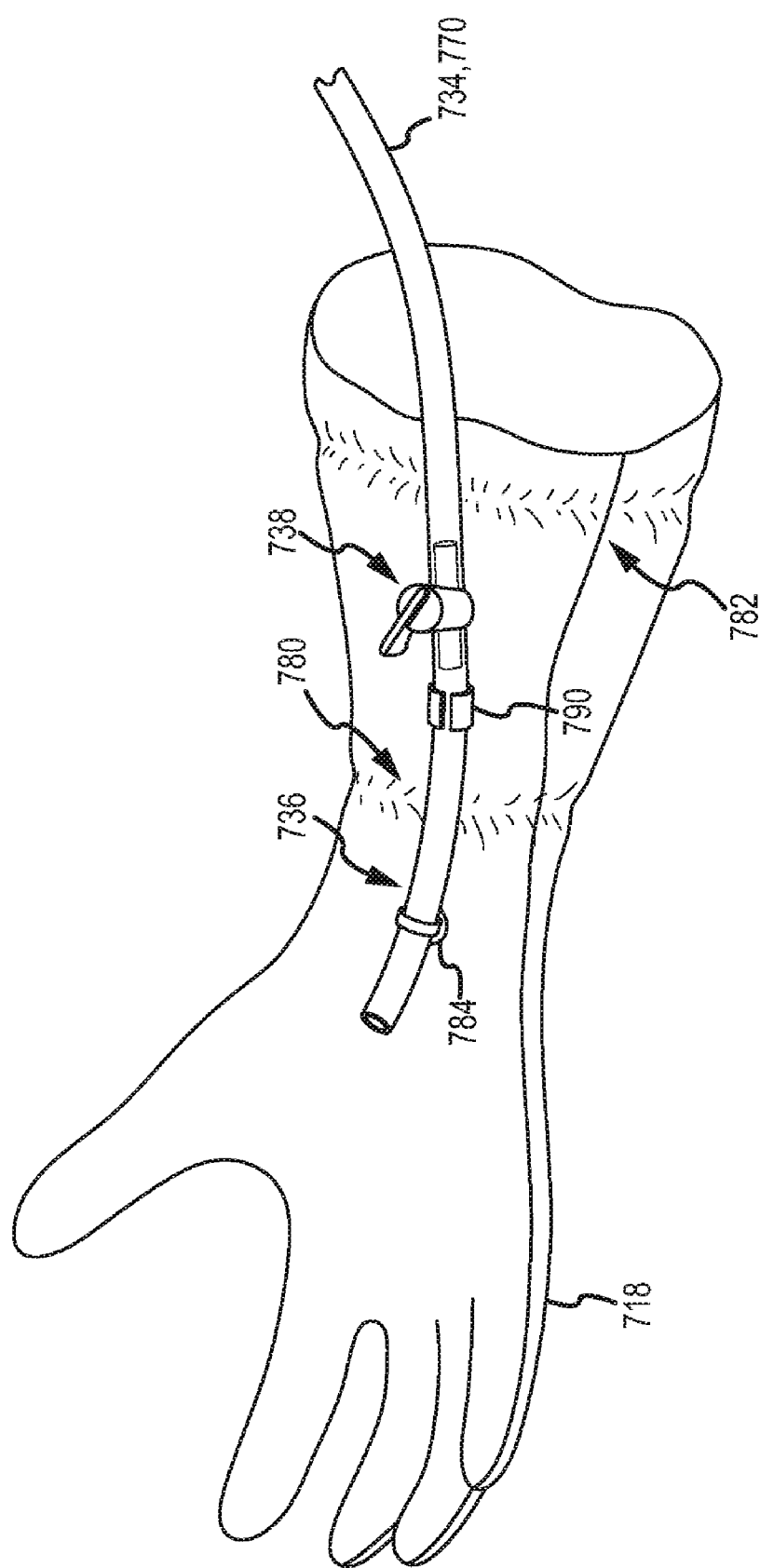
FIG. 7 is magnified palm view of an interchangeable wash glove with the end of a water tube installed in accordance with an embodiment of the present invention.

FIG. 7 is magnified palm view of a wash glove 718 with the end of a water tube 736 installed in accordance with an embodiment of the present invention. According to the current example, water or a water and soap mixture is delivered to the dirty area of the pet by the glove tube 736. In order to consistently present the fluids at a point that is most effective for cleaning the pet which is near the fingers, it is desirable to maintain glove tube 736 in a proper position, as illustrated in FIG. 7, for example.

According to one embodiment, wash glove 718 is constructed of a microfiber material with elastic straps 780 and 782 sewn inside to provide a tight fit for the user. As illustrated by the current example, glove tube 736, control valve 738 and fluid tube 734 or 774 may be maintained in place on wash glove 718 by elastic strap assembly 784 and Velcro strap assembly 790. In this manner, wash glove 718 can be easily removed from all bladder assemblies for both washing and drying. Additionally, wash gloves 718 may be interchangeable between the right hand and left hand; therefore in this example wash gloves 718 are easily changeable between water tube 734 and mixture tube 770.

Figure 8:
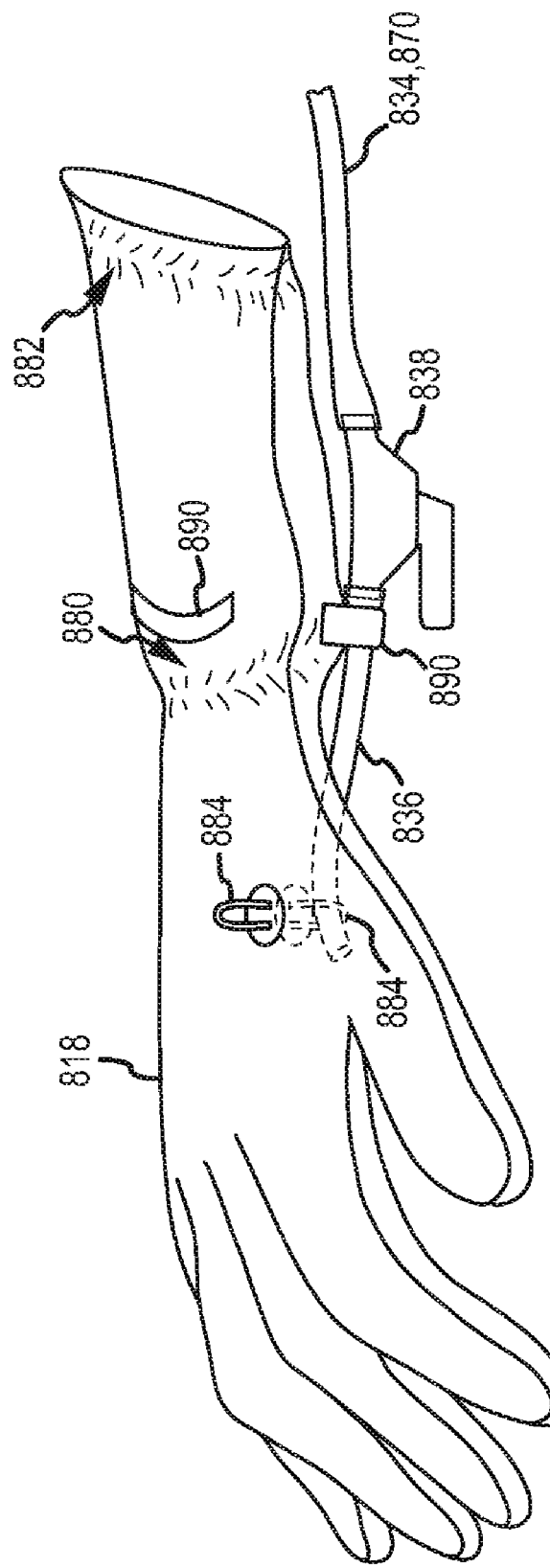
FIG. 8 is a magnified top and side view of the wash glove of FIG. 7.

FIG. 8 is a magnified top and side view of the wash glove 718 of FIG. 7. According to the present example, each wash glove 818 has two elastic strap assemblies 884 and two Velcro strap assemblies 890 for maximum flexibility and use. FIGS. 9, 10 and 11 present detailed constructions of various components for the interface of glove tube 836 to glove 818 in accordance with various embodiments. Based on the disclosure provided herein, one of ordinary skill in the art will recognize a variety of different strap configurations that may be used in relation to different embodiments of the present invention. For example, more or fewer strap assemblies 884 and 890 may be provided than depicted and their positioning may be modified accordingly.

FIG. 9 is a magnified side view of an exit tube 936 in accordance with an embodiment of the present invention. In this example, exit tube 936 is constructed of a curved tube 992 with loop Velcro 996 attached to the end closest to control valve 938. According to one embodiment, exit tube 936 also has tube end 994, which provides the method for securing the end of exit tube 936 to wash glove 418/718/818 by elastic strap assembly 784/884 (not shown). In one embodiment, the vertical notch in tube end 994 is engaged by an elastic loop to maintain the position of exit tube 936 as described below with reference to FIG. 11. Based on the disclosure provided herein, one of ordinary skill in the art will recognize a variety of alternative mechanisms for maintaining the positioning of exit tube 936 with respect to glove 418/718/818.

FIG. 10 is a magnified side view of an exit tube hold down strap 1090 in accordance with an embodiment of the present invention. Hook Velcro 1000, which is sewn into belt 1098 to form Velcro strap assembly 1090, secures to loop Velcro 996 (of FIG. 9). Velcro strap assembly 1090 may be sewn to wash glove 418/718/818 between elastic straps 780/880 and 782/882 on both sides of the wrist of wash glove 418/718/818.

FIG. 11 is magnified side view of an exit tube hold down elastic 1184 in accordance with an embodiment of the present invention. In the current example, elastic strap assembly 1184 is constructed with both ends of elastic strap 1104 placed through slots in rubber pad 1102. Elastic strap assembly 1184 is sewn into the palm and backhand of wash glove 818 as illustrated in FIG. 8.

FIG. 12 is a magnified view of a bladder clip assembly 1280 that may be used in accordance with an embodiment of the present invention. According to the current example, bladder clip assembly 1280 includes a hook 1282 attached to back panel 1278 of the waist pack 112/412 by an elastic strap 1284.

FIG. 13 is a magnified view of a tube clip 1376 that may be used in accordance with an embodiment of the present invention. In the present example, tube clip 1376 is constructed of two semi circles connected in the middle. Based on the disclosure provided herein, one of ordinary skill in the art will recognize a variety of alternative mechanisms for securing the tubes with respect to each other, including, but not limited to rubber bands, twist ties and the like.

FIG. 14 is a magnified top view and FIG. 15 is a magnified side view of a dual glove water bladder 1428 in accordance with an embodiment of the present invention. The dual glove water bladder 1428 is constructed of two independent side walls 1446 connected by an edge seal 1442. The volume of the dual glove water bladder 1428 is between approximately two to five liters. In one embodiment, the dual glove water bladder 1428 has a capacity of six to ten liters and more typically, eight liters.

In the present example, edge seal 1442 has hook openings 1444 for maintaining the bladder in the correct upright position when placed into waist pack 112/412. As illustrated in FIGS. 14 and 15, outlet 1432 is constructed through wall 1446 comprising a tubular tee 1448 and waterproof flange 1450. As illustrated in FIGS. 14 and 15, outlet 1452 may be placed in the middle lower section of water bladder 1428 so as to be in the lowest portion of the bladder to facilitate the gravity feed flow of water as contemplated herein. In one embodiment, water tubes 1434 and 1474 are placed on the ends of tubular tee 1448. In alternative embodiments, water tubes 1434 and 1474 may connect to tubes associated with separate and independent waterproof flanges, e.g., waterproof flange 1450. Dual glove water bladder 1428 is filled with fluid, e.g., water for rinsing a pet, via outlet neck 1430, which can be sealed with cap member 1432.

FIG. 16 is a magnified top view and FIG. 17 is a magnified side view of a single glove water bladder 1672 in accordance with an embodiment of the present invention. Single glove water bladder 1672 represents an example of an alternative bladder configuration to that of the dual glove water bladder 1428. The single glove water bladder may be used in connection with a single wash glove 418/718/818. In one embodiment, single glove water bladder 1672 is constructed in substantially the same manner as the dual glove water bladder 1428, but potentially has a smaller volume (e.g., on the order of approximately three to four liters). In one embodiment, the single glove water bladder 1672 can hold three and one half liters of fluid. In the current example, the single glove water bladder 1628 has outlet 1664 which has a tubular elbow 1666 for a single water exit. Tubular elbow 1666 is placed through wall 1646 and secured by watertight flange 1668. Single glove water bladder 1672 is also filled by outlet neck 1630 and closed by cap member 1632.

In one embodiment, tubing (e.g., 534, 574, 556 and 570) has an outside diameter of ½ inch and an inside diameter of ⅜ inch which produces a wash time of approximately 125 seconds when using both gloves with a dual bladder capacity of eight liters with both valves fully open.

FIG. 18 is a magnified top view and FIG. 19 is a magnified side view of a soap bladder 1858 in accordance with an embodiment of the present invention. In one embodiment, the construction of soap bladder 1858 is similar to bladders 1428 and 1672 in that two independent side walls 1946 are connected to edge seal 1842. Edge seal 1842 has one hook opening 1844 for securing soap bladder 1858 in an upright position when placed into waist pack 112/412. Soap bladder 1858 is filled with soap, conditioner or other desired cleaning/conditioning fluid or fluid mixture via outlet neck 1830 closed by cap member 1832. The fluid mixture exits soap bladder 1858 from outlet 1864 which is constructed though wall 1846 comprising a tubular elbow 1866 and a waterproof flange 1868 in a position that is at a low point in the bladder to facilitate gravity assisted flow. A soap tube (e.g., soap tube 556) is placed on the end of tubular elbow 1866.

As discussed above with reference to FIG. 5, in one embodiment, the user can control the flow of the soap mixture by means of soap valve 560. In placing soap valve 560 in a position above Y connector 554, the user can change the contents of mixture tube 570 from water to a soap/water mixture. The user can easily change the flow to each wash glove 418/718/818 by quickly moving to the opposite wrist for any adjustment.

Figure 20:
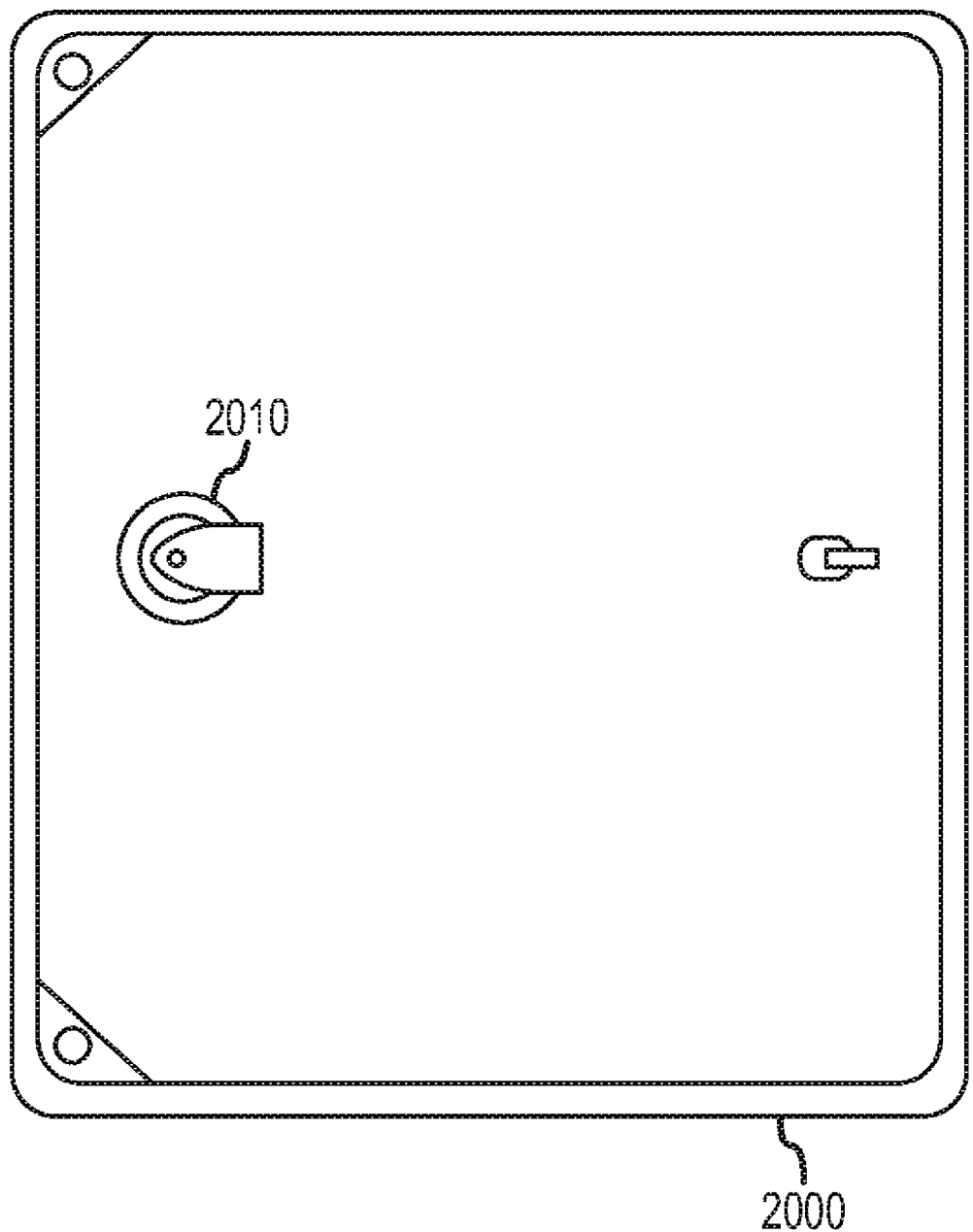
FIG. 20 is a magnified top view of a single exit water bladder with a cap collar in accordance with an embodiment of the present invention.
Figure 21:
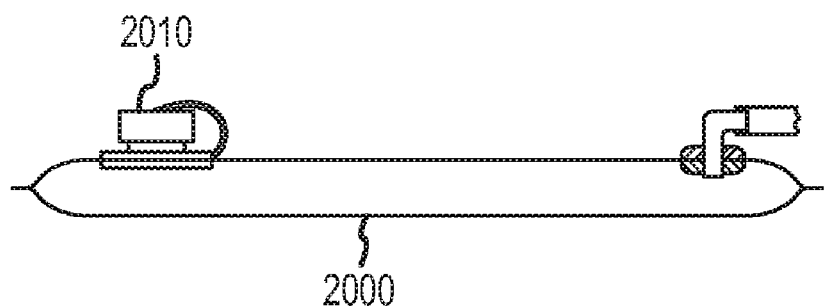
FIG. 21 is a magnified side view of the single exit water bladder of FIG. 20.
Figure 22:
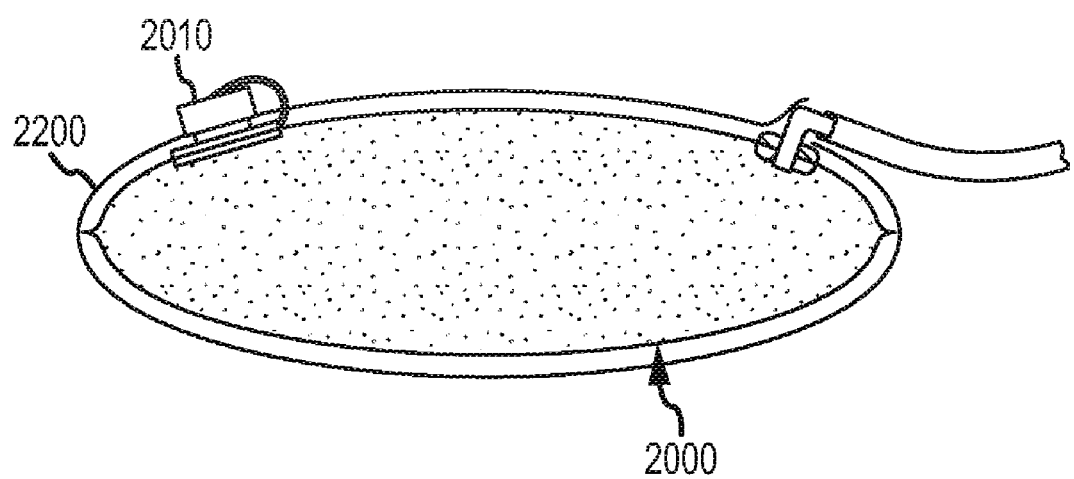
FIG. 22 is a magnified side view of the single exit water bladder of FIG. 20 installed in waist pack in accordance with an embodiment of the present invention.

FIG. 20 is a magnified top view of a single exit water bladder 2000 with a cap collar 2010 in accordance with an embodiment of the present invention. FIG. 21 is a magnified side view of the single exit water bladder 2000 of FIG. 20. FIG. 20 and FIG. 21 show the bladder 2000 with a cap collar 2010 that provides the dual purposes of 1) securing the cap to the bladder 2000 thereby preventing cap misplacement and 2) as illustrated in FIG. 22 maintaining the bladder position within the pack 2200 by means of the overlap of the cap collar 2010 to the pack hole through which the cap protrudes.

Figure 23:
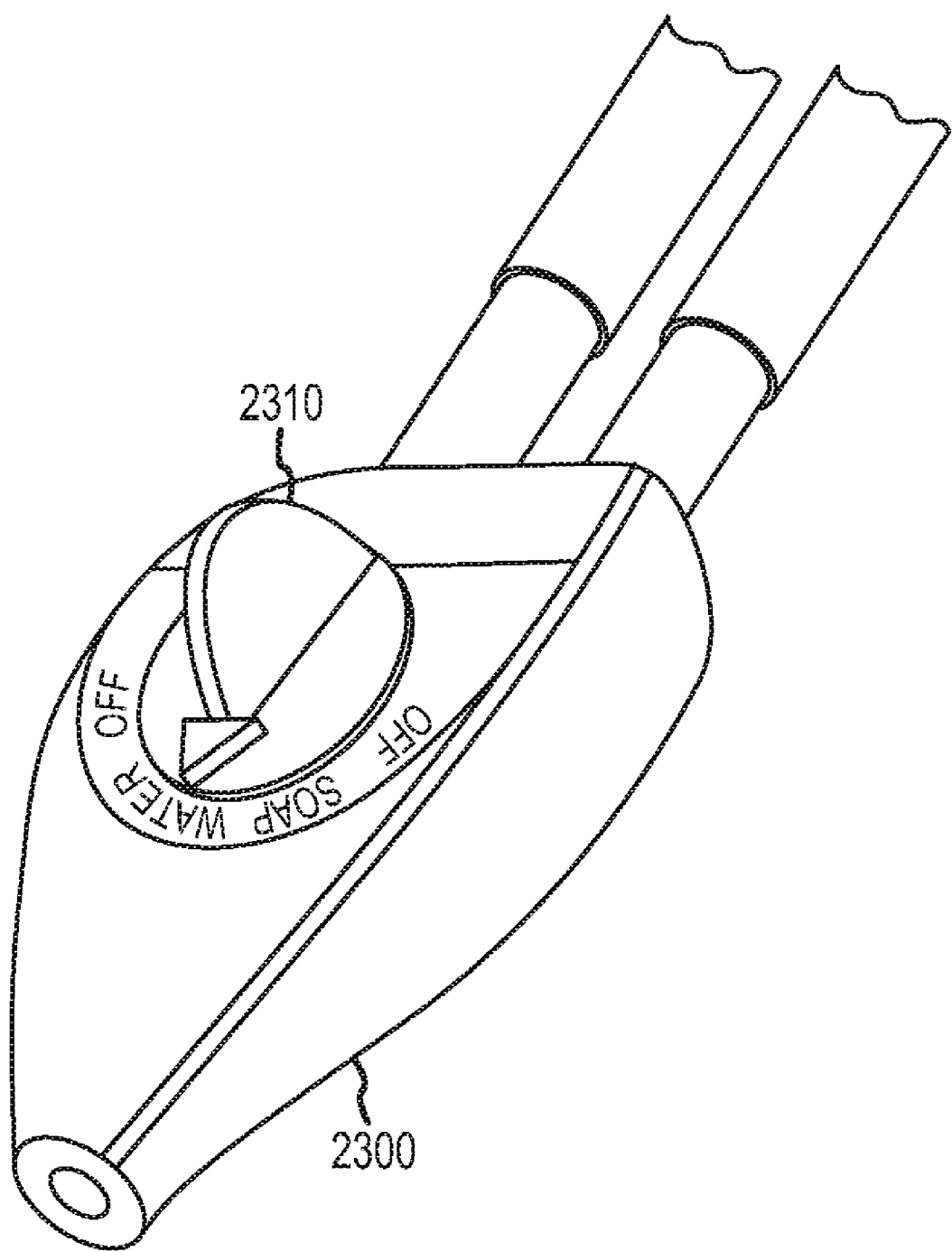
FIG. 23 shows various individual fluid control components combined within a single enclosure that provides fluid mixing, control and delivery to the glove in accordance with an embodiment of the present invention.

FIG. 23 shows various individual fluid control components, for example, those depicted in FIG. 2, combined within a single enclosure 2300 that provides fluid mixing, control and delivery to the glove in accordance with an embodiment of the present invention. According to this example, the user can select to produce (i) no flow by turning the dial 2310 to either of the "off" positions thereby closing both tubes (e.g., a soap tube and a water tube) (ii) a flow of liquid originating completely from a soap bladder by turning the dial 2310 to the "soap" position thereby opening the soap tube, and closing or keeping the water tube closed, (iii) a flow of liquid representing a mixture from the water bladder and the soap bladder by turning the dial 2310 to an intermediate position between the "soap" and "water" positions and (iv) a flow of liquid originating completely from a water bladder by turning the dial 2310 to the "water" position thereby opening the water tube, and closing or keeping the soap tube closed.

While embodiments of the invention have been illustrated and described, it will be clear that the invention is not limited to these embodiments only. Numerous modifications, changes, variations, substitutions, and equivalents will be apparent to those skilled in the art, without departing from the spirit and scope of the invention, as described in the claims.

What is claimed is:

1. A fully contained portable pet washing system comprising:
   one or more collapsible fluid bladders;
   one or more fluid tubes interfacing with the one or more collapsible fluid bladders;
   a variable flow control valve operable to control dispensing of wash or rinsing fluid from each of the one or more collapsible fluid bladders to only a single detachable fabric-based wash glove;
   a bladder holder pack configured to be fastened as an adjustable waist belt and configured to enclose some portion of the one or more collapsible fluid bladders; and
   wherein the single detachable fabric-based wash glove includes at least a portion of an attachment means for affixing the one or more fluid tubes or the variable flow control valve to a surface of the single detachable fabric-based wash glove and maintaining positioning thereof to facilitate pet cleaning by dispensing the wash or rinsing fluid at a location near a palm or finger portion of the single detachable fabric-based wash glove via a gravity-assisted flow originating from the one or more collapsible fluid bladders.

2. The portable pet washing system of claim 1, wherein:
   a first collapsible fluid bladder of the one or more collapsible fluid bladders is for temporarily storing water to be delivered via a first fluid tube of the one or more fluid tubes to the single detachable fabric-based wash glove; and
   a second collapsible fluid bladder of the one or more collapsible fluid bladders is for temporarily storing a mixture of one or more of soap, rinse or conditioner to be delivered via a second fluid tube of the one or more fluid tubes to the single detachable fabric-based wash glove.

3. The portable pet washing system of claim 2, further comprising:
   a third collapsible fluid bladder of the one or more collapsible fluid bladders for temporarily storing additional water to be delivered via a third fluid tube of the one or more fluid tubes; and
   a Y connector joining the third fluid tube to the second fluid tube.

4. The portable pet washing system of claim 1, wherein the single detachable fabric-based wash glove includes at least a portion of the attachment means on both a top and bottom surface thereof, thereby allowing the single detachable fabric-based wash glove to be configured for operation by a left-handed or a right-handed user.

5. The portable pet washing system of claim 1, wherein the single detachable fabric-based wash glove comprises a six-finger glove, whereby the single detachable fabric-based wash glove can be worn on either a left hand or a right hand of an end user.

6. A fully contained portable pet washing system comprising:
   a collapsible water bladder;
   one or more fluid tubes interfacing at proximal ends thereof with the collapsible water bladder;
   a control valve having a first setting and a second setting receiving distal ends of the one or more fluid tubes, when placed in the first setting, the control valve operable to produce a gravity-assisted flow of a treatment fluid to a single detachable fabric-based wash glove by mixing water from the collapsible water bladder with an additional fluid and when placed in the second setting, the control valve operable to produce a gravity-assisted flow of a rinsing fluid to the single detachable fabric-based wash glove by avoiding mixing water from the collapsible water bladder with the additional fluid;
   a bladder holder pack configured to be fastened to an end user as an adjustable waist belt and configured to enclose some portion of the collapsible water bladder; and
   wherein the single detachable fabric-based wash glove has a first surface, the first surface having a fastener integrated therein to affix the control valve or the one or more fluid tubes to the first surface and maintain positioning thereof to facilitate pet treatment or cleaning by directing the gravity-assisted flow of the treatment fluid or the gravity-assisted flow of the rinsing fluid to a location near a palm or finger portion of the single detachable fabric-based wash glove.

7. The portable pet washing system of claim 6, further comprising an additional collapsible bladder contained within the bladder holder pack and wherein the additional fluid originates from the additional collapsible bladder.

8. The portable pet washing system of claim 6, wherein the additional fluid comprises soap, conditioner, an over-the-counter medical mixture or a medical mixture prescribed by a veterinarian to treat a skin or coat condition of a pet.

9. The portable pet washing system of claim 6, wherein the single detachable fabric-based wash glove is constructed of a microfiber material.

10. The portable pet washing system of claim 9, wherein the single detachable fabric-based wash glove comprises a five-finger glove that can be fastened to the control valve or the one or more fluid tubes via snap fastener components integrated within both a top surface and a bottom surface of the five-finger glove, whereby the five-finger glove can be detached, flipped over and reattached to the portable pet washing system so as to allow it to be worn on either a left hand or a right hand of the end user.

11. The portable pet washing system of claim 9, wherein the single detachable fabric-based wash glove comprises a six-finger glove, whereby the detachable fabric-based wash glove can be worn on either a left hand or a right hand of the end user.

* * * * *